US011990328B2

(12) United States Patent
Miura et al.

(10) Patent No.: US 11,990,328 B2
(45) Date of Patent: May 21, 2024

(54) MASS SPECTROMETER

(71) Applicant: SHIMADZU CORPORATION, Kyoto (JP)

(72) Inventors: Hiroyuki Miura, Kyoto (JP); Hideaki Izumi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 17/723,652

(22) Filed: Apr. 19, 2022

(65) Prior Publication Data

US 2022/0406588 A1 Dec. 22, 2022

(30) Foreign Application Priority Data

Jun. 16, 2021 (JP) ................................ 2021-100229

(51) Int. Cl.
*H01J 49/40* (2006.01)
*H01J 49/24* (2006.01)

(52) U.S. Cl.
CPC ............ *H01J 49/408* (2013.01); *H01J 49/24* (2013.01)

(58) Field of Classification Search
CPC ................................ H01J 49/408; H01J 49/24
USPC ......................... 250/281, 282, 283, 286, 287
See application file for complete search history.

(56) References Cited

U.S. PATENT DOCUMENTS

2004/0195502 A1 10/2004 Hashimoto et al.
2006/0289746 A1* 12/2006 Raznikov ............. G01N 27/623 250/288
2021/0013022 A1 1/2021 Tateishi

FOREIGN PATENT DOCUMENTS

JP 2009-146905 A 7/2009
JP 2021-015688 A 2/2021
WO 2013/057505 A2 4/2013

* cited by examiner

*Primary Examiner* — Nicole M Ippolito
(74) *Attorney, Agent, or Firm* — Sughrue Mion, PLLC

(57) ABSTRACT

A mass spectrometer 1 includes a vacuum container 5 divided into a first chamber 51 containing an ion trap 3 and a second chamber 52 containing a time-of-flight mass spectrometer 4. The ion trap 3 is held within an ion-trap-holding space 610 surrounded by a wall 61. In this wall 61, a cooling-gas discharge port 64 is formed in addition to an introduction-side ion passage port 62 and an ejection-side ion passage port 63. A cooling gas supplied into an ion-capturing space 315 of the ion trap 3 is discharged from the ion-trap-holding space 610 through the three ports. The provision of the cooling-gas discharge port 64 reduces the amount of cooling gas flowing into the ejection-side ion passage port 63 and interfering with the ejection of ions from the ion trap 3 into the time-of-flight mass spectrometer 4. Consequently, the detection intensity of the ions is improved.

3 Claims, 5 Drawing Sheets

MASS SPECTROMETER

TECHNICAL FIELD

The present invention relates to a mass spectrometer, and more specifically, to an ion trap time-of-flight mass spectrometer (IT-TOFMS).

BACKGROUND ART

An IT-TOFMS includes an ion trap configured to capture ions and a time-of-flight mass spectrometer (TOFMS) configured to detect ions after separating them based on their times of flight which correspond to their respective mass-to-charge ratios m/z (for example, see Patent Literatures 1 and 2). The ion trap and TOFMS are arranged within a vacuum container. The ion trap has a plurality of electrodes as well as an ion introduction port for introducing ions into the inner space and an ion ejection port for ejecting ions from the inner space toward the TOFMS. By creating an electric field within the space surrounded by those electrodes, the ion trap captures ions introduced within that space and then ejects only a specific kind of ion at a predetermined timing. The ion trap is electrically insulated from the wall of the vacuum container by an insulating spacer (see Patent Literature 2).

The ions ejected from the ion ejection port at a predetermined timing are introduced into the flight space in the TOFMS. Ions which have completed their flight in the flight space are detected by a detector. A time-of-flight spectrum which shows the relationship between the time of flight and the detection intensity is created, and the time of flight in the time-of-flight spectrum is converted into m/z to obtain a mass spectrum.

During the period of time from the capturing of ions within the ion trap to the ejection of the ions, an inert gas, such as argon gas, is introduced into the ion trap. This gas is called the "cooling gas" in Patent Literature 1. The cooling gas thus introduced cools the ions and lowers the kinetic energy of the ions. Lowering the kinetic energy of the ions in this manner before ejecting them from the ion trap reduces the variation in the speed of the ions of the same m/z value at the time of the ejection of the ions. This in turn reduces the variation in the time of flight for the ions to reach the detector, so that the m/z resolving power is improved.

CITATION LIST

Patent Literature

Patent Literature 1: JP 2021-015688 A
Patent Literature 2: JP 2009-146905 A

SUMMARY OF INVENTION

Technical Problem

The cooling gas introduced into the ion trap flows out of the ion ejection port of the ion trap. Therefore, the ions within the ion trap collide with the molecules of the cooling gas not only while the ions are being cooled (i.e., while they are captured within the ion trap) but also when the ions are ejected from the ion ejection port. Due to this collision, some of the ions are prevented from entering the flight space in the TOFMS, while some other ions enter the flight space yet deviate from the intended flight path. In both cases, the ions cannot reach the detector, so that the detection intensity of the ions will be lowered.

The problem to be solved by the present invention is to provide an IT-TOFMS which can reduce the decrease in the detection intensity of the ions caused by the cooling gas.

Solution to Problem

The mass spectrometer according to the present invention developed for solving the previously described problem includes:

- a vacuum container including a first chamber and a second chamber each of which is configured to be internally evacuated, as well as an opening through which the first chamber and the second chamber communicate with each other;
- an ion trap including a plurality of electrodes arranged within the first chamber, the ion trap having an ion introduction port for introducing ions into an ion-capturing space which is a space surrounded by the plurality of electrodes and an ion ejection port for ejecting ions from the ion-capturing space;
- a gas introduction tube for introducing a cooling gas into the ion-capturing space;
- an ion trap holder located within the first chamber and configured to hold the ion trap within an ion-trap-holding space surrounded by a wall, the ion trap holder having the following ports formed in the wall: an introduction-side ion passage port connected to the ion introduction port; an ejection-side ion passage port located between the ion ejection port and the opening; and a cooling-gas discharge port provided apart from the introduction-side ion passage port and the ejection-side ion passage port; and
- a time-of-flight mass spectrometer located within the second chamber, the time-of-flight mass spectrometer including a flight space in which ions ejected from the ion ejection port into the second chamber through the ejection-side ion passage port and the opening are made to fly, and a detector configured to detect ions which completed a flight in the flight space.

Advantageous Effects of Invention

In the mass spectrometer according to the present invention, the cooling gas introduced from the gas introduction tube into the ion-capturing space in the ion trap flows through the gap between the plurality of electrodes forming the ion-capturing space, as well as through the cooling-gas discharge port in the ion trap holder, into the space which is outside the ion trap holder yet inside the first chamber, from which the cooling gas is further discharged to the outside of the first chamber due to the evacuation of the inner space of the first chamber. This configuration reduces the amount of cooling gas flowing to the ion ejection port, so that the decrease in the detection intensity of the ions is reduced.

DESCRIPTION OF EMBODIMENTS

An IT-TOFMS 1 as one embodiment of the mass spectrometer according to the present invention is hereinafter described using FIGS. 1-8.

(1) Configuration of IT-TOFMS According to Present Embodiment

Figure 1:
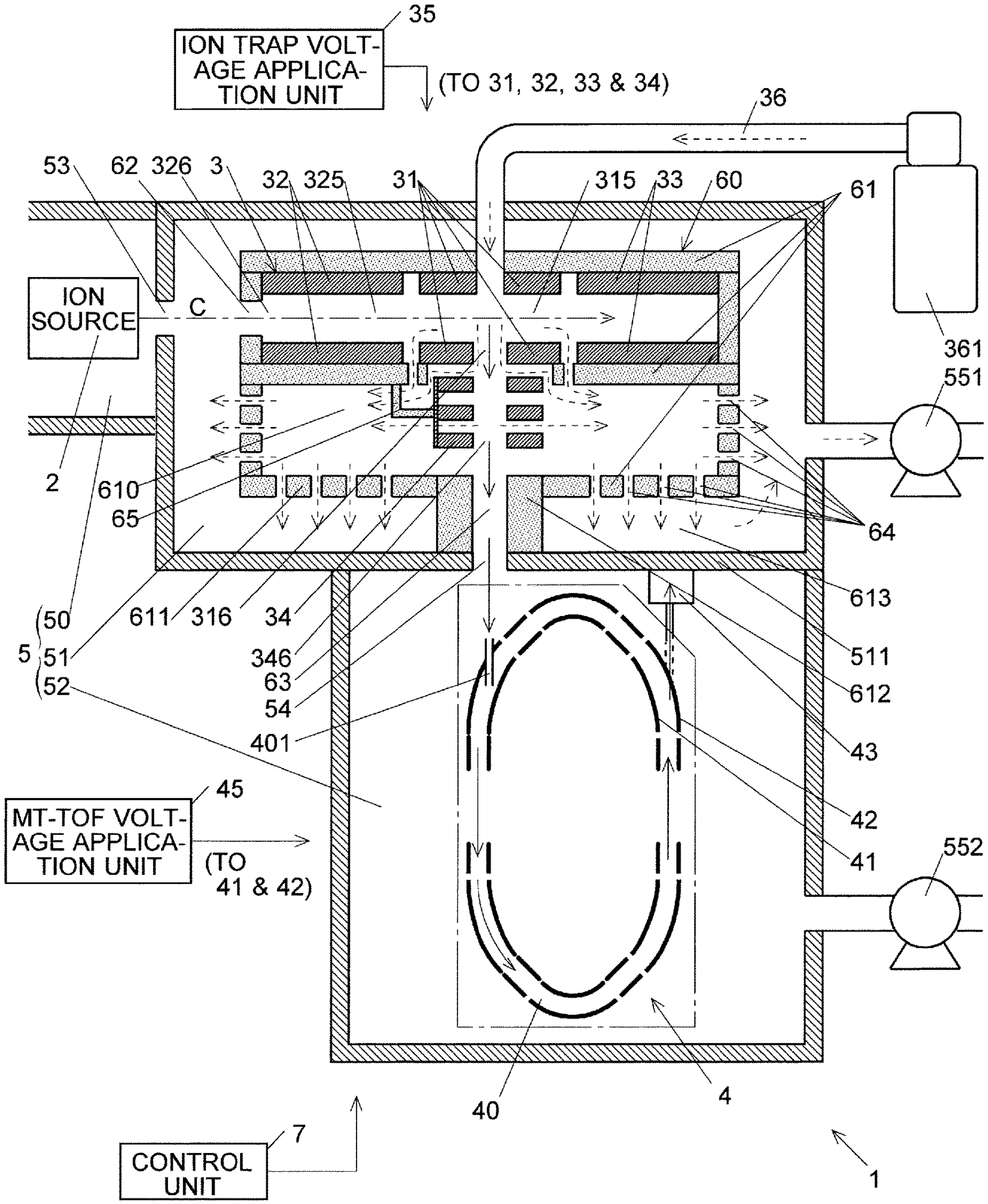
FIG. 1 is a schematic configuration diagram showing an IT-TOFMS as one embodiment of the mass spectrometer according to the present invention.

As shown in FIG. 1, the IT-TOFMS 1 according to the present embodiment has an ion source 2, ion trap 3, TOFMS 4 and vacuum container 5. The vacuum container 5 has its inner space divided into a front chamber 50 (which is only partially depicted in FIG. 1), first chamber 51 and second chamber 52 by partition walls. The front chamber 50 is located on a lateral side of the first chamber 51. The second chamber 52 is located below the first chamber 51. A first opening 53 is formed in the partition wall between the front chamber 50 and the first chamber 51, while a second opening 54 (which corresponds to the "opening" in the present invention) is formed in the partition wall (the bottom plate 511 of the first chamber 51) between the first chamber 51 and the second chamber 52. The front chamber 50, first chamber 51 and second chamber 52 are evacuated with a front-chamber vacuum pump (not shown), first-chamber vacuum pump 551 and second-chamber vacuum pump 552, respectively. The ion source 2, ion trap 3 and TOFMS 4 are contained in the front chamber 50, first chamber 51 and second chamber 52, respectively.

The ion source 2 is a device for ionizing components in a sample to be analyzed. For example, a liquid sample whose components have been temporally separated by a column in a liquid chromatograph (LC) is used as the sample. When this type of liquid sample is used, an atmospheric pressure ion source which ionizes components in a sample liquid in an ambience of atmospheric pressure, such as an electrospray ion source, can be used as the ion source 2. However, there is no specific limitation on the configuration of the ion source 2 in the present invention; any type of ion source commonly used in mass spectrometers can be appropriately used.

Figure 2:
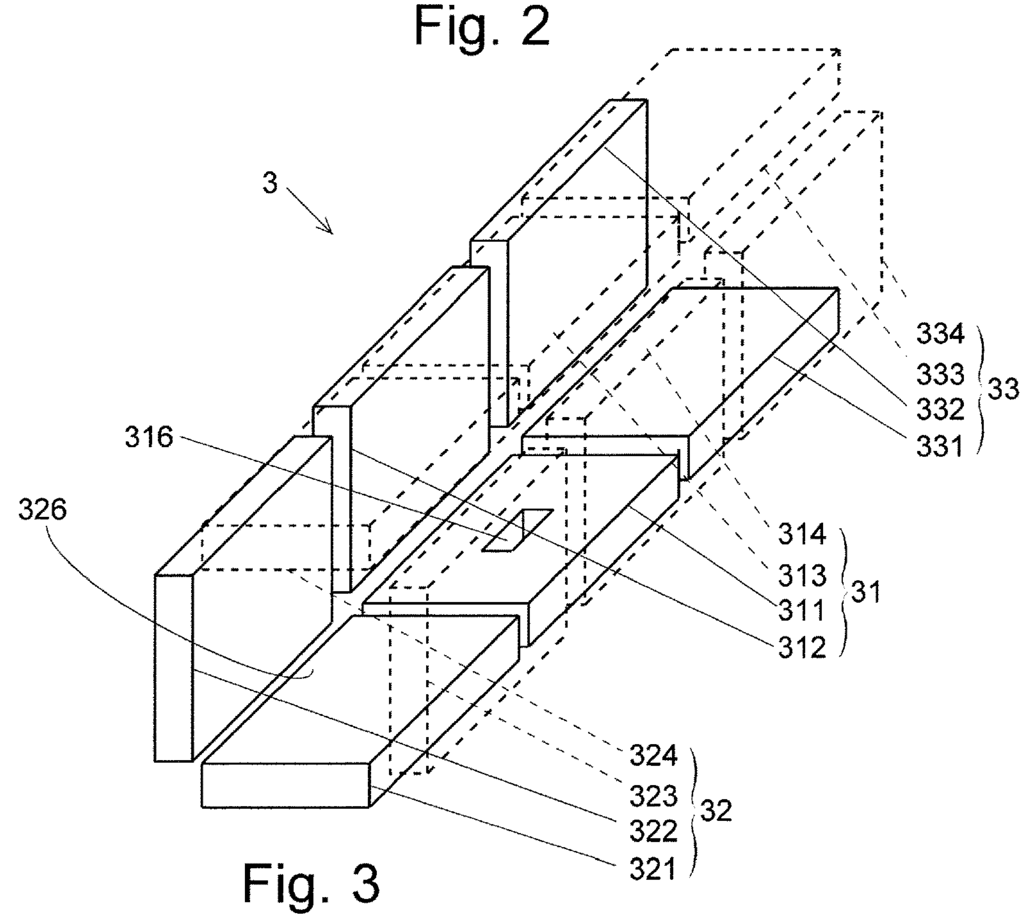
FIG. 2 is a perspective view showing the ion trap in the IT-TOFMS according to the present embodiment.

As for the ion trap 3, a parallel-plate linear ion trap is used in the present embodiment. As shown in FIG. 2, this ion trap 3 has a main electrode 31 as well as an ion introduction-side end electrode 32 and an ion non-introduction-side end electrode 33 which are arranged so that the main electrode 31 is sandwiched between them.

The main electrode 31 consists of a first main plate electrode 311 and a third main plate electrode 313 which are two plate electrodes arranged parallel to each other with the linear central axis C in between, as well as a second main plate electrode 312 and a fourth main plate electrode 314 which are two plate electrodes arranged perpendicularly to the first main plate electrode 311 and the third main plate electrode 313 with the central axis C in between. The space surrounded by these first through fourth main plate electrodes 311-314 functions as the ion-capturing space 315 (see FIG. 1). Among the first through fourth main plate electrodes 311-314, the first main plate electrode 311 is located on the lower side. A hole, which functions as the ion ejection port 316, is formed at the center of the first main plate electrode 311. It should be noted that, in FIG. 2, the third main plate electrode 313 located above the first main plate electrode 311, and the fourth main plate electrode 314 located in front of the first main plate electrode 311, are depicted in broken line so as to explicitly show the first main plate electrode 311 and the ion ejection port 316.

The ion introduction-side end electrode 32 includes a first introduction-side end plate electrode 321, second introduction-side end plate electrode 322, third introduction-side end plate electrode 323 and fourth introduction-side end plate electrode 324 which are arranged as if the main electrode 31 has been translated parallel to the central axis C. No ion ejection port is formed in the first through fourth introduction-side end plate electrodes 321-324. In the space surrounded by the first through fourth introduction-side end plate electrodes 321-324, the end portion of the ion introduction-side end electrode 32 opposite to the main electrode 31 functions as an ion introduction port 326. The aforementioned space functions as an ion passage space 325 (see FIG. 1) which the ions introduced from the ion introduction port 326 pass through.

The ion non-introduction-side end electrode 33 includes a first non-introduction-side end plate electrode 331, second non-introduction-side end plate electrode 332, third non-introduction-side end plate electrode 333 and fourth non-introduction-side end plate electrode 334 which are arranged as if the main electrode 31 has been translated parallel to the central axis C in the opposite direction to the ion introduction-side end electrode 32. Neither the ion introduction port nor the ion ejection port is formed in the first through fourth non-introduction-side end plate electrodes 331-334.

An extraction electrode 34 is located on the outside of the ion-capturing space 315 as viewed from the ion ejection port 316. The extraction electrode 34 includes a plurality of plate electrodes arranged parallel to each other, in which a hole 346 facing the ion ejection port 316 is formed at the center of each plate electrode.

As shown in FIG. 1, the IT-TOFMS 1 has an ion-trap voltage application unit 35. The ion-trap voltage application unit 35 is a power source for applying predetermined voltages to the main electrode 31, ion introduction-side end electrode 32, ion non-introduction-side end electrode 33 and extraction electrode 34 at predetermined timings. These timings and voltages will be described later along with a description of the operation of the IT-TOFMS 1.

An ion trap holder 60 is fixed to the bottom plate 511 of the first chamber 51. The ion trap holder 60 has a wall 61 made of an insulator. An ion-trap-holding space 610 surrounded by the wall 61 is formed in the ion trap holder 60. The ion trap 3 (main electrode 31, ion introduction-side end electrode 32 and ion non-introduction-side end electrode 33) is held within this ion-trap holding space 60 and fixed to the wall 61. The extraction electrode 34 is fixed to a supporting part 65 made of an insulator extending from the wall 61.

The wall 61 has an introduction-side ion passage port 62 connected to the ion introduction port 326, as well as an ejection-side ion passage port 63 located between the ion ejection port 316 and the second opening 54 (and furthermore, between the hole 346 in the extraction electrode 34 and the second opening 54).

In the portions of the wall 61 corresponding to the bottom portion 611 and the side wall of the ion trap holder 60, a number of cooling-gas discharge ports 64 each of which is a hole are formed. Each cooling-gas discharge port 64 is a hole which connects the ion-trap holding space 610 to a space which is outside the ion-trap holding space 610 yet inside the first chamber 51. The bottom portion 611 of the ion trap holder 60 is supported by a pillar 612 made of an insulator above the bottom plate 511 of the first chamber 51. By this structure, a space 613 which allows a flow of gas to pass through is formed between the bottom portion 611 of the ion trap holder 60 and the bottom plate 511 of the first chamber 51.

An ion trap holder formed by a wall made of an insulator for holding an ion trap has also been used in conventional IT-TOFMSs. However, the conventional ion trap holder is not provided with the cooling-gas discharge ports.

Within the ion-capturing space 315, one end of a gas introduction tube 36 is located. This tube extends from outside the vacuum container 5 and penetrates the wall of the vacuum container 5, the wall 61 of the ion trap holder 60, and the third main plate electrode 313. The gas introduction tube 36 is used for supplying the ion-capturing space 315 with an inert gas (e.g., argon, helium or nitrogen gas) from a gas supply source (gas cylinder) 361 located outside the vacuum container 5.

Figure 3:
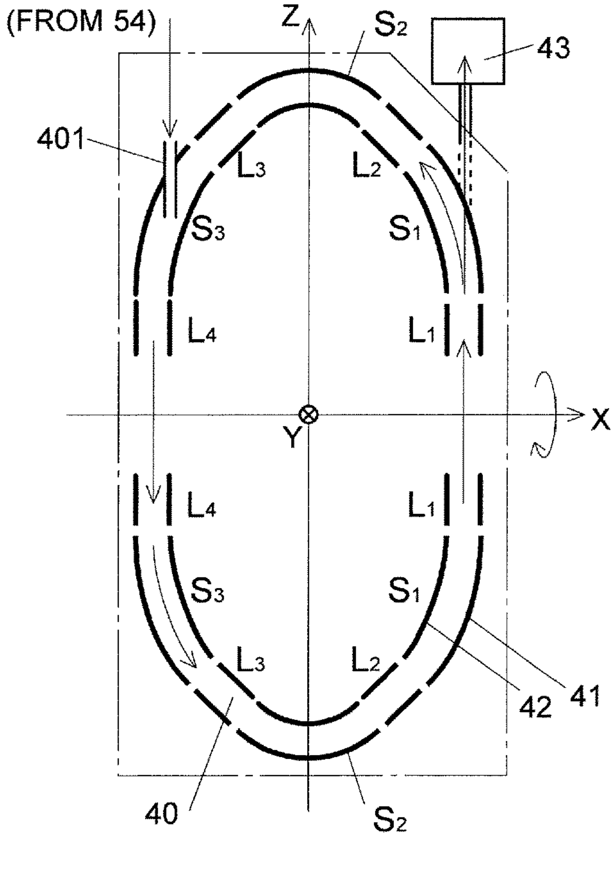
FIG. 3 is a ZX sectional view showing the multiturn TOFMS (MT-TOFMS) in the IT-TOFMS according to the present embodiment.
Figure 4:
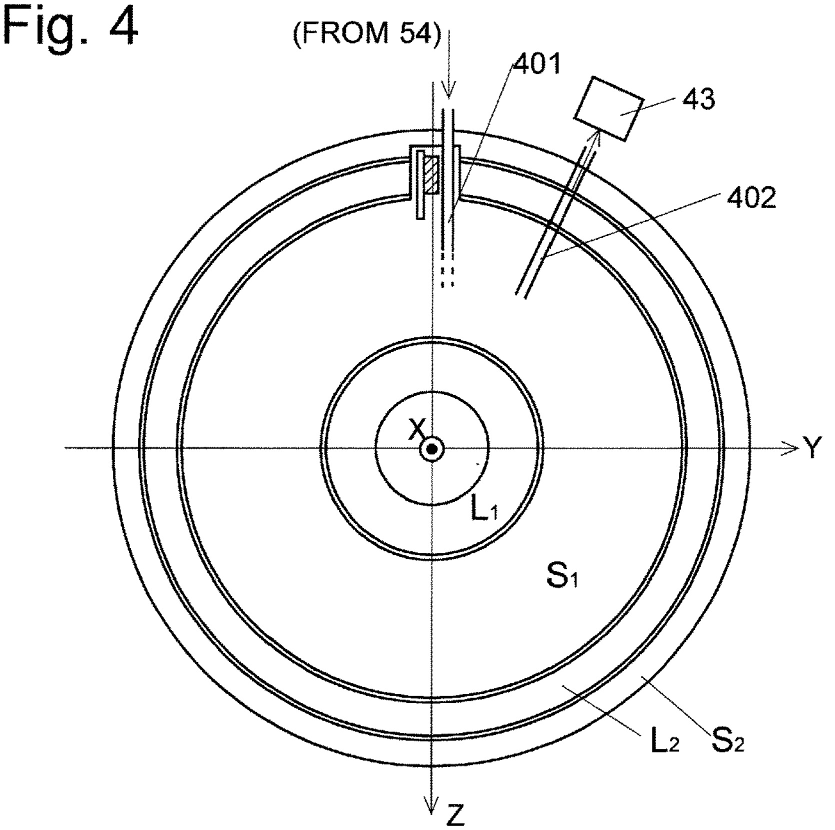
FIG. 4 is a YZ plan view of the MT-TOFMS.

In the present embodiment, a multiturn TOFMS (MT-TOFMS) is used as the TOFMS 4. As shown in FIG. 3, this TOFMS 4 includes an outer electrode 41 having a spheroidal shape, an inner electrode 42 having a substantially spheroidal shape and located inside the outer electrode 42, and an ion detector 43. FIG. 3 is a sectional view (vertical sectional view) at the ZX plane, which is a plane containing the X axis that is the axis of rotation of the substantial spheroids of the outer and inner electrodes 41 and 42 as well as the Z axis that is an axis extending in one direction perpendicular to the X axis. The X axis extends in a substantially horizontal direction, while Z axis extends in a substantially vertical direction. Cutting the outer and inner electrodes 41 and 42 at a plane containing the X axis always reveals a section having substantially the same shape as shown in FIG. 3, regardless of the angle of orientation of the section (i.e., the angular position around the Z-axis). FIG. 4 is a side view observed from the positive side of the X axis. The axis perpendicular to both of the Z and X axes is the Y axis. The plane containing the X and Y axes is the XY plane.

The outer and inner electrodes 41 and 42 are formed by three partial-electrode pairs $S_1$, $S_2$ and $S_3$ each of which consists of a pair of electrodes having a curved shape in the ZX plane and facing each other, combined with four partial-electrode pairs $L_1$, $L_2$, $L_3$ and $L_4$ each of which consists of a pair of electrodes having a linear shape in the ZX plane and facing each other. The partial-electrode pair $S_2$ as viewed on the ZX plane is located at both ends of the main electrode 31 in the Z direction and has a symmetrical shape with respect to the Z axis. The partial-electrode pair $S_1$ is located on the positive side of the Z direction as viewed from the partial-electrode pair $S_2$. The partial-electrode pair $S_3$ is located on the negative side of the X direction as viewed from the partial-electrode pair $S_2$ and is symmetrical to the partial-electrode pair $S_1$ with respect to the Z axis. The partial-electrode pair $L_2$ is located between the partial-electrode pairs $S_1$ and $S_2$. The partial-electrode pair $L_3$ is located between the partial-electrode pairs $S_2$ and $S_3$, having a symmetrical shape to the partial-electrode pair $L_2$ with respect to the Z axis. The partial-electrode pair $L_1$ is shaped like a doughnut plate perpendicular to the X axis and is located on the positive side of the X direction as well as inside the partial-electrode pair $S_1$ when projected onto the XY plane. The partial-electrode pair $L_4$ is located on the negative side of the X direction, having a symmetrical shape to the partial-electrode pair $L_1$ with respect to the Z axis. The combination of those partial-electrode pairs gives each of the outer and inner electrodes 41 and 42 a substantially spheroidal shape in their entirety.

A MT-TOF voltage application unit 45 is connected to the partial-electrode pairs $S_1$, $S_2$ and $S_3$ among the partial-electrode pairs constituting the outer and inner electrodes 41 and 42. The MT-TOF voltage application unit 45 is configured to give potentials to the partial-electrode pairs $S_1$, $S_2$ and $S_3$, respectively, so as to create an electric field directed from the outer electrode 41 toward the inner electrode 42. Thus, within an ion flight space 40 which is the space between the outer and inner electrodes 41 and 42, a loop-flight electric field is created which makes ions fly in an orbit within the flight space 40.

The partial-electrode pair $S_3$ in the outer electrode 41 is provided with a MT-TOF ion inlet 401 for introducing ions exiting from the second opening 54 into the flight space 40. The MT-TOF ion inlet 401 is located at a position slightly displaced from the Z axis toward the positive side of the Y direction, and is arranged so that the ions from the ion source 2 are injected substantially parallel to the Z axis. The ions undergo a centripetal force from the loop-flight electric field created by the partial-electrode pair $S_1$ at a position immediately after the point of injection from the MT-TOF ion inlet 401 into the flight space 40. Additionally, due to the displacement of the MT-TOF ion inlet 401 from the Z axis toward the positive side of the Y direction, the ions also undergo a force directed toward the Z-axis direction.

Figure 5:
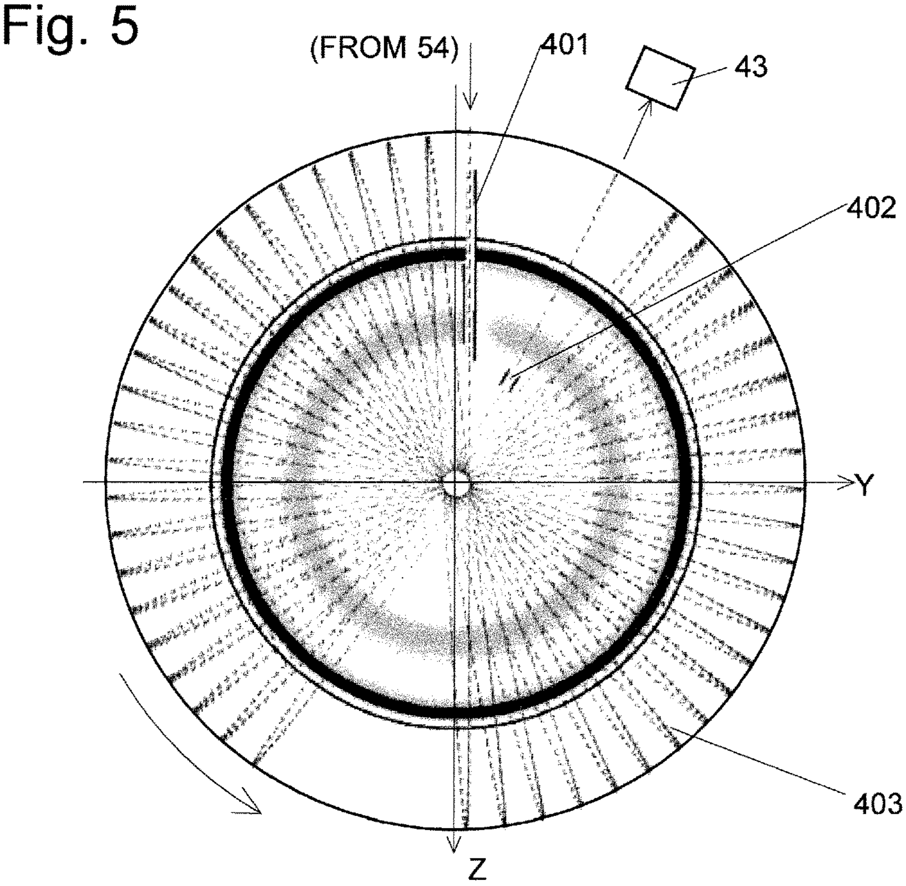
FIG. 5 is a diagram showing an orbit of an ion in the MT-TOFMS.

Consequently, the ions fly in an orbit 403 (see FIG. 5) in which the ions fly along the substantially elliptical loop orbit a plurality of times within the flight space 40 while the loop orbit gradually changes its orientation counterclockwise as viewed from the positive side of the Y direction for each turn of the ions. In FIG. 5, the orbit 403 of the ions is shown by a top view projected onto the XY plane.

The partial-electrode pair $S_1$ in the outer electrode 41 is provided with a MT-TOF ion outlet 402 for making ions exit from the flight space 40 after the ions have turned within the flight space 40 a plurality of times (typically, tens of times). The ions which have exited from the MT-TOF ion outlet 402 fly in a linear path. The ion detector 43 is placed on this linear path.

Additionally, the IT-TOFMS 1 includes a control unit 7, which is configured to control the operations of the components of the IT-TOFMS 1, such as the ion source 2, ion-trap voltage application unit 35, MT-TOF voltage application unit 45 and ion detector 43.

(2) Operation of IT-TOFMS According to Present Embodiment

An operation of the IT-TOFMS 1 according to the present embodiment is hereinafter described using FIGS. 6-8. During the period of time from before the beginning of the use of the IT-TOFMS 1 through its starting phase, the gas in the front chamber 50, first chamber 51 and second chamber 52 is removed from those chambers by the front-chamber vacuum pump, first-chamber vacuum pump 551 and second-chamber vacuum pump 552, respectively. This evacuation is performed in a differential manner so that the degree of vacuum increases (and the pressure decreases) from the front chamber 50 to the first chamber 51 as well as from the first chamber 51 to the second chamber 52.

The ion source 2 ionizes a sample into positive ions by a commonly known method. The positive ions P generated in the ion source 2 are sequentially introduced into the ion trap 3 through the introduction-side ion passage port 62 and the ion introduction port 326. In the ion trap 3, the three steps of (i) accumulation, (ii) cooling and (iii) ejection are performed, as will be hereinafter described.

(2-1) Operation of Ion Trap 3

(i) Accumulation of Ions

Figure 6:
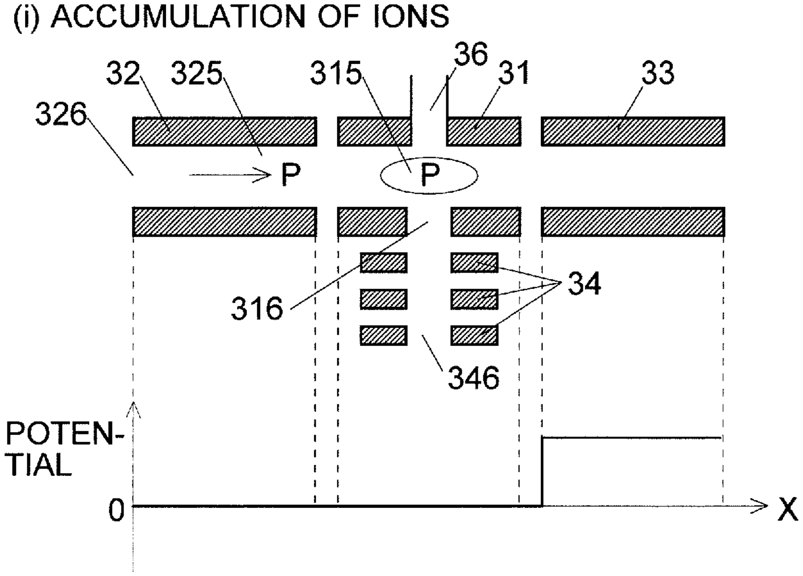
FIG. 6 is a diagram showing an operation in the step of accumulating ions in the ion trap, and a graph showing the potential within the ion trap.

In the ion accumulation step, as shown in the lower diagram in FIG. 6, the ion-trap voltage application unit 35 applies a voltage between the ion non-introduction-side end electrode 33 and the ground so that the ion non-introduction-side end electrode 33 (or more specifically, the first through fourth non-introduction-side end plate electrodes 331-334) has a positive potential. The main electrode 31 and the ion introduction-side end electrode 32 both have a potential of zero. When the potentials are thus given to the electrodes, the positive ions P introduced into the ion trap 3 pass through the ion passage space 325 surrounded by the ion introduction-side end electrode 32 having a zero potential and reach the ion-capturing space 315 surrounded by the main electrode 31 which also has a zero potential. However, those ions will not enter the ion non-introduction-side end electrode 33 since the ion-introduction-side end electrode 33 has a positive potential. Consequently, the positive ions P are gradually accumulated within the ion-capturing space 315 (see the upper diagram in FIG. 6).

(ii) Cooling of Ions

Figure 7:
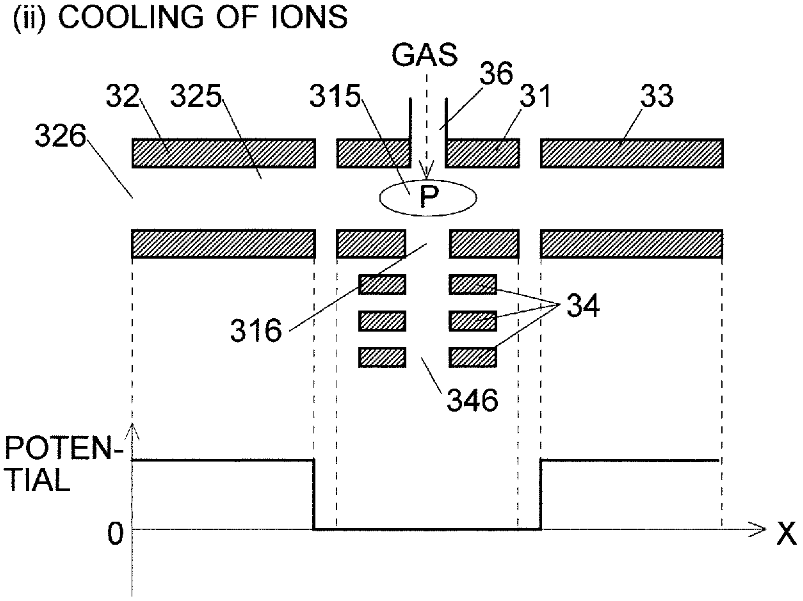
FIG. 7 is a diagram showing an operation in the step of cooling ions in the ion trap, and a graph showing the potential within the ion trap.
Figure 8:
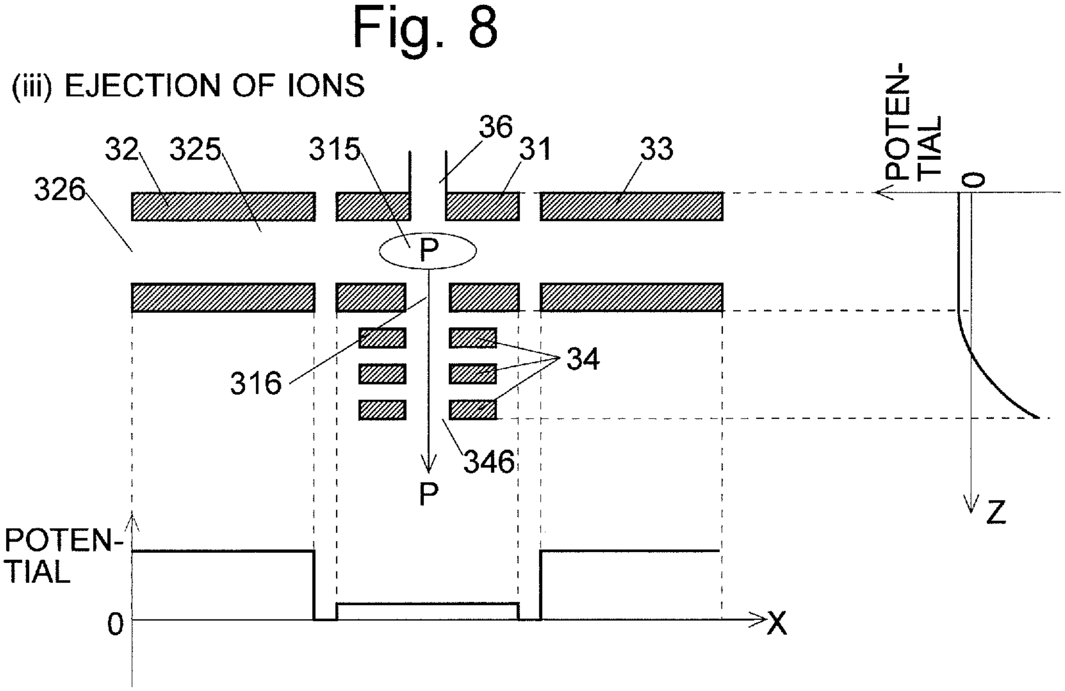
FIG. 8 is a diagram showing an operation in the step of ejecting ions accumulated in the ion trap, as well as a graph showing the potential within the ion trap and the extraction electrode.

After the accumulation of the positive ions P has been continued for a predetermined period of time, the ion-trap voltage application unit 35 applies a voltage between the ion introduction-side end electrode 32 and the ground so that the ion introduction-side end electrode 32 (or more specifically, the first through fourth introduction-side end plate electrodes 321-324) has a positive potential, while maintaining the potentials of the main electrode 31 and the ion non-introduction-side end electrode 33 (at 0 and a positive value, respectively; see the lower diagram in FIG. 7). Consequently, the positive ions P are confined within the ion-capturing space 315, being prevented from flowing backward into the ion passage space 325 (see the upper diagram in FIG. 7).

In this state, the cooling gas is supplied from the gas supply source 361 into the ion-capturing space 315 through the gas introduction tube 36. The positive ions P are thereby cooled, and the kinetic energy of the positive ions P is lowered.

Most of the cooling gas supplied into the ion-capturing space 315 exits from the ion-capturing space 315 through the gap between the plate electrodes of the main electrode 31 as well as the gap between the main electrode 31 and the ion introduction-side end electrode 32 or ion non-introduction-side end electrode 33. The cooling gas which has exited from the ion-capturing space 315 further flows through the cooling-gas discharge ports 64 into the first chamber 51 due to the pressure reduction by the first-chamber vacuum pump 551, and is ultimately discharged from the first chamber 51 to the outside (as for the flow of the cooling gas described in this paragraph, see the broken arrows in FIG. 1).

Meanwhile, a portion of the cooling gas within the ion-capturing space 315 flows through the ion ejection port 316 into an area near the extraction electrode 34, from which the gas further flows through the hole 346 and the ejection-side ion passage port 63 into the second chamber 52, to be ultimately discharged to the outside of the second chamber 52 by the second vacuum pump 552. Since the second chamber 52 is evacuated to a higher degree of vacuum (and a lower pressure) than the first chamber 51 by the second-chamber pump 552, the cooling gas near the extraction electrode 34 is quickly discharged.

(iii) Ejection of Ions

After the ions have been sufficiently cooled, the supply of the cooling gas is stopped. Then, the ion-trap voltage application unit 35 applies a voltage between the main electrode 31 and the ground so that the potential of the main electrode 31 becomes a positive potential that is lower than the potentials of the ion introduction-side end electrode 32 and the ion non-introduction-side end electrode 33, while maintaining the potentials of the ion introduction-side end electrode 32 and the ion non-introduction-side end electrode 33 (see the lower diagram in FIG. 8). Simultaneously with this operation, the ion-trap voltage application unit 35 applies a voltage between the extraction electrode 34 and the ground so that the plate electrodes forming the extraction electrode 34 have negative potentials whose absolute values gradually increase with increasing distance from the main electrode 31 (see the right diagram in FIG. 8). The positive ions P within the ion-capturing space 315 are thereby accelerated toward the extraction electrode 34, pass through the hole 346 in the extraction electrode 34 and enter the TOFMS 4.

In a conventional IT-TOFMS, the cooling gas introduced into the ion trap holder cannot be discharged from the ion trap holder without passing through the introduction-side ion passage port or the ejection-side ion passage port. Due to the gas-discharging resistance at these two passage ports, the cooling gas is likely to stagnate, particularly around the extraction electrode located near the ejection-side ion passage port. Therefore, some of the positive ions ejected from the ion-capturing space collide with the molecules of the cooling gas stagnating near the extraction electrode. Consequently, some ions are prevented from entering the flight space in the TOFMS, while some other ions enter the flight space yet deviate from the intended flight path. Since those ions cannot reach the detector, the detection sensitivity will be lower. By comparison, in the IT-TOFMS 1 according to the present embodiment, the cooling gas in the ion trap holder 60 can be discharged through the cooling-gas discharge ports 64 of the ion trap holder 60. The amount of cooling gas reaching an area near the extraction electrode 34 is thereby reduced, so that a higher level of detection sensitivity can be achieved.

(2-2) Operation of TOFMS 4

The positive ions P introduced into the TOFMS 4 pass through the TOF ion inlet 401 and enter the flight space 40. In the flight space 40, due to the loop-flight electric field created within the flight space 40, the positive ions P fly in an orbit 403 in which the ions fly along the substantially elliptical loop orbit a plurality of times, with the loop orbit gradually changing its orientation counterclockwise as viewed from the positive side of the Y direction for each turn of the ions (see FIG. 5). After flying in the loop orbit a plurality of times, the positive ions P reach the MT-TOF ion outlet 402 and leave the orbit 403, to be detected by the ion detector 43. The time of flight from the ejection of a positive ion P from the ion-capturing space 315 of the ion trap 3 to the detection of the same ion by the ion detector 43 depends on the m/z value of the ion. Therefore, a mass spectrum can be obtained by creating a time-of-flight spectrum which shows the relationship between the time of flight and the detection intensity in the ion detector 43, and then converting the time of flight into m/z.

The MT-TOF type of TOFMS 4 used in the present embodiment makes positive ions P fly in the loop orbit a plurality of times. Therefore, a longer flight distance can be obtained than in the case of making ions fly in a linear path. This advantageously leads to a higher level of time-of-flight resolving power, and consequently, a higher level of m/z resolving power. However, the MT-TOF type of TOFMS 4 has a drawback: if the positive ion P in the ion-capturing space 315 of the ion trap 3 has a high amount of kinetic energy at the moment of ejection, the positive ion P may possibly deviate from the intended loop orbit within the flight space 40 in the TOFMS 4 depending on the direction of its initial velocity, with the result that the ion fails to be detected by the ion detector 43, causing the detection intensity to be lower. By comparison, in the IT-TOFMS 1 according to the present embodiment, since the cooling gas supplied into the ion-capturing space 315 of the ion trap 3 is discharged to the outside of the ion trap holder 60 through the cooling-gas discharge ports 64 in the ion trap holder 60, a sufficient amount of cooling gas can be supplied without causing the molecules of the cooling gas to interfere with the flight of the positive ion P in the vicinity of the extraction electrode 34. Thus, the kinetic energy of the positive ion P within the ion-capturing space 315 can be sufficiently lowered, so that the positive ion P will be prevented from deviating from the intended loop orbit within the flight space 40 of the TOFMS 4 depending on the direction of its initial velocity. Consequently, the detection intensity in the ion detector 43 will be improved.

(3) Modified Examples

The present invention is not limited to the previously described embodiment; it can be modified in various forms. The modified examples described hereinafter are some of those various modified examples. There are also other possible variations.

In the previously described embodiment, the ion trap 3 (including the main electrode 31, ion introduction-side end electrode 32 and ion non-introduction-side end electrode 33) is fixed to the wall 61 made of an insulator. As another possibility, the wall of the ion trap holder may be made of a non-insulator (e.g., metal), and a holding part made of an insulator may be provided between the ion trap and the wall. This configuration can create electric insulation between the ion trap and the wall or other external elements while holding the ion trap with the ion trap holder.

In the previously described embodiment, a parallel-plate linear ion trap formed by a combination of plate electrodes is used as the ion trap 3. A linear ion trap formed by a combination of rod electrodes in place of the plate electrodes may also be used. Other commonly known types of ion traps used in IT-TOFMSs can also be used in the present invention.

In the previously described embodiment, a MT-TOFMS is used as the TOFMS 4, in place of which any commonly known type of TOFMS used in IT-TOFMSs may be used, such as a TOFMS with a linear flight space or a TOFMS which makes ions fly in a roughly round-trip path within the flight space by repelling the ions with a reflector.

The aforementioned modified examples of the ion trap 3 and those of the TOFMS 4 may be appropriately combined.

[Modes] A person skilled in the art can understand that the previously described illustrative embodiment is a specific example of the following modes of the present invention.

(Clause 1)

A mass spectrometer according to Clause 1 includes:

a vacuum container including a first chamber and a second chamber each of which is configured to be internally evacuated, as well as an opening through which the first chamber and the second chamber communicate with each other;

an ion trap including a plurality of electrodes arranged within the first chamber, the ion trap having an ion introduction port for introducing ions into an ion-capturing space which is a space surrounded by the plurality of electrodes and an ion ejection port for ejecting ions from the ion-capturing space;

a gas introduction tube for introducing a cooling gas into the ion-capturing space;

an ion trap holder located within the first chamber and configured to hold the ion trap within an ion-trap-holding space surrounded by a wall, the ion trap holder having the following ports formed in the wall: an introduction-side ion passage port connected to the ion introduction port; an ejection-side ion passage port located between the ion ejection port and the opening; and a cooling-gas discharge port provided apart from the introduction-side ion passage port and the ejection-side ion passage port; and a time-of-flight mass spectrometer located within the second chamber, the time-of-flight mass spectrometer including a flight space in which ions ejected from the ion ejection port into the second chamber through the ejection-side ion passage port and the opening are made to fly, and a detector configured to detect ions which completed a flight in the flight space.

In the mass spectrometer according to Clause 1, the cooling gas introduced from the gas introduction tube into the ion-capturing space in the ion trap flows through the gap between the plurality of electrodes forming the ion-capturing space, as well as through the cooling-gas discharge port in the ion trap holder, into the space which is outside the ion trap holder yet inside the first chamber, from which the cooling gas is further discharged to the outside of the first chamber due to the evacuation of the inner space of the first chamber. This configuration reduces the amount of cooling gas flowing to the ion ejection port, so that the decrease in the detection intensity of the ions is reduced.

The wall may be made of an insulator or a non-insulator (e.g., metal). In the case of using the wall made of a non-insulator, it is preferable to create electric insulation between the ion trap and the wall (and other elements external to the ion trap holder) by providing a holding part made of an insulator between the ion trap and the wall.

(Clause 2)

In the mass spectrometer according to Clause 2, which is a specific form of the mass spectrometer according to Clause 1, the time-of-flight mass spectrometer is a multiturn time-of-flight mass spectrometer.

A multiturn time-of-flight mass spectrometer is a type of time-of-flight mass spectrometer which includes a set of electrodes configured to create an electric field within a flight space so as to make ions fly in a substantially identical loop orbit a plurality of times within the flight space, and an ion detector located at a position at which the ions arrive after flying in the loop orbit a plurality of times within the flight space.

Multiturn time-of-flight mass spectrometers are characterized in that a longer flight distance can be obtained than in the case of making ions fly in a linear path, so that a higher level of time-of-flight resolving power, and consequently, a higher level of m/z resolving power can be achieved. However, multiturn time-of-flight mass spectrometers generally have the problem that ions may deviate from the intended loop orbit depending on the direction of the initial velocity of the ions at the moment of ejection into the flight space, with the result that the ions fail to be detected by the ion detector, causing the detection intensity to be lower. By comparison, in the mass spectrometer according to Clause 2, since the cooling gas supplied into the ion-capturing space of the ion trap is discharged through the cooling-gas discharge ports and other areas to the outside of the first chamber, suppressing the amount of cooling gas flowing into the ion ejection port. Therefore, a sufficient amount of cooling gas can be supplied so as to sufficiently lower the kinetic energy of the ions within the ion-capturing space. Consequently, the initial velocity of the ions at the moment of ejection into the flight space in the multiturn time-of-flight mass spectrometer will be sufficiently lowered, so that the deviation of the ions from the intended loop orbit depending on the direction of their initial velocity will be prevented, and the detection intensity in the ion detector will be improved.

(Clause 3)

The mass spectrometer according to Clause 3 is a specific form of the mass spectrometer according to Clause 1 or 2 and further includes a differential pumping system configured to evacuate the vacuum container so that the degree of vacuum in the second chamber becomes higher than the degree of vacuum in the first chamber.

In the mass spectrometer according to Clause 3, the vacuum container is evacuated in a differential manner so that the degree of vacuum in the second chamber becomes higher than the degree of vacuum in the first chamber. Therefore, even if a portion of the cooling gas flows into an area near the ion ejection port, that cooling gas is quickly discharged to the outside of the vacuum container through the second chamber which has a higher degree of vacuum. Thus, the cooling gas is prevented from interfering with the ejection of the ions into the time-of-flight mass spectrometer.

REFERENCE SIGNS LIST

1 . . . Ion Trap Time of Flight Mass Spectrometer (IT-TOFMS)
2 . . . Ion Source
3 . . . Ion Trap
31 . . . Main Electrode
311 . . . First Main Plate Electrode
312 . . . Second Main Plate Electrode
313 . . . Third Main Plate Electrode
314 . . . Fourth Main Plate Electrode
315 . . . Ion-Capturing Space
316 . . . Ion Ejection Port
32 . . . Ion Introduction-Side End Electrode
321 . . . First Introduction-Side End Plate Electrode
322 . . . Second Introduction-Side End Plate Electrode
323 . . . Third Introduction-Side End Plate Electrode
324 . . . Fourth Introduction-Side End Plate Electrode
325 . . . Ion Passage Space
326 . . . Ion Introduction Port
33 . . . Ion Non-Introduction-Side End Electrode
331 . . . First Non-Introduction-Side End Plate Electrode
332 . . . Second Non-Introduction-Side End Plate Electrode
333 . . . Third Non-Introduction-Side End Plate Electrode
334 . . . Fourth Non-Introduction-Side End Plate Electrode
34 . . . Extraction Electrode
346 . . . Hole
35 . . . Ion-Trap Voltage Application Unit
36 . . . Gas Introduction Tube
361 . . . Gas Supply Source (Gas Cylinder)
4 . . . Time-of-Flight Mass Spectrometer (TOFMS)
40 . . . Flight Space
401 . . . MT-TOF Ion Inlet
402 . . . MT-TOF Ion Outlet
403 . . . Orbit
41 . . . Outer Electrode
42 . . . Inner Electrode
43 . . . Ion Detector
45 . . . TOF Voltage Application Unit
5 . . . Vacuum Container
50 . . . Front Chamber
51 . . . First Chamber
511 . . . Bottom Plate
52 . . . Second Chamber
53 . . . First Opening
54 . . . Second Opening
551 . . . First-Chamber Vacuum Pump
552 . . . Second-Chamber Vacuum Pump
60 . . . Ion Trap Holder
61 . . . Wall of Ion Trap Holder
610 . . . Ion-Trap-Holding Space
611 . . . Bottom Portion of Ion Trap Holder
612 . . . Pillar of Ion Trap Holder
613 . . . Space Through Which Gas Can Pass
62 . . . Introduction-Side Ion Passage Port
63 . . . Ejection-Side Ion Passage Port
64 . . . Cooling-Gas Discharge Port
65 . . . Supporting Part
7 . . . Control Unit

The invention claimed is:

1. A mass spectrometer, comprising:

a vacuum container including a first chamber and a second chamber each of which is configured to be internally evacuated, as well as an opening through which the first chamber and the second chamber communicate with each other, wherein the opening is formed in a plate partitioning between the first chamber and the second chamber;

an ion trap including a plurality of electrodes arranged within the first chamber, the ion trap having an ion introduction port for introducing ions into an ion-capturing space which is a space surrounded by the plurality of electrodes and an ion ejection port for ejecting ions from the ion-capturing space;

a gas introduction tube for introducing a cooling gas into the ion-capturing space;

an ion trap holder located within the first chamber and configured to hold the ion trap within an ion-trap-holding space surrounded by a wall, the ion trap holder having following ports formed in the wall: an introduction-side ion passage port connected to the ion introduction port; an ejection-side ion passage port located between the ion ejection port and the opening; and a cooling-gas discharge port provided apart from the introduction-side ion passage port and the ejection-side ion passage port, wherein the wall is connected to the plate by a pillar and the ejection-side ion passage port continues into the opening through the pillar; and a time-of-flight mass spectrometer located within the second chamber, the time-of-flight mass spectrometer including a flight space in which ions ejected from the ion ejection port into the second chamber through the ejection-side ion passage port and the opening are made to fly, and a detector configured to detect ions which completed a flight in the flight space.

2. The mass spectrometer according to claim 1, wherein the time-of-flight mass spectrometer is a multiturn time-of-flight mass spectrometer.

3. The mass spectrometer according to claim 1, further comprising a differential pumping system configured to evacuate the vacuum container so that a degree of vacuum in the second chamber becomes higher than a degree of vacuum in the first chamber.

* * * * *